Patented Aug. 29, 1944

2,357,124

UNITED STATES PATENT OFFICE 2,357,124

STABILIZATION OF SOIL

Abraham B. Miller, deceased, late of Newark, Del., by Hazel E. Miller, administratrix, Newark, Del., assignor to Hercules Powder Company, Wilmington, Del., a corporation of Delaware No Drawing. Application August 14, 1942, Serial No. 454,836

10 Claims. (Cl. 106—123)

This invention relates to soil stabilization, and more particularly to stabilizing soil by mixing therewith a mixture of tall oil and a substantially petroleum-hydrocarbon insoluble pine wood resin.

Soil stabilization is a treatment of soils, especially road soils, so that they are more suitable as road building materials. In doing this, natural deficiencies of the soil are corrected. For example, in the case of some road soils, poor load-bearing qualities are taken care of. In the case of other road soils which have poor moisture resistance, they are stabilized to prevent rutting, frost heaving, and other phenomena associated with weakening of the road by water.

Heretofore, it has been proposed to stabilize soil by blending soils of various particle sizes and physical and chemical properties. For example, one type of soil may give strength and hardness for resisting abrasive action of traffic, while another may provide for interlocking of the soil grains and give an increase in shear strength. Then there should be enough clay-like material in the blend present to absorb water and maintain stability in dry weather. Silt might be desired to act as a filler and give a capillary bond in the presence of water when the clay present becomes weak by losing cohesion in wet weather. The difficulty with this method of stabilization is that in grading and selecting and blending the quantities of various types of road materials, an enormous volume of materials must be handled.

The stabilization of soil has been proposed through the addition of deliquescent materials to assist in maintaining the desired water content, to prevent dusting, and to prevent the roads from becoming muddy in wet weather. Also, water-soluble binders such as sulfite liquor concentrate and distillery wastes have been proposed. Likewise, bituminous emulsions have found some application for stabilizing road soil.

Now in accordance with this invention, it has been found that soil can be stabilized by admixing therewith an aqueous suspension of tall oil and substantially petroleum-hydrocarbon insoluble pine wood resin, said suspension containing a dispersing agent. The soil may or may not be adjusted first with the necessary aggregate or soil fines to bring the soil to recognized mechanical analysis for optimum strength and serviceability.

The term "soil" hereinbefore referred to means natural earthy decomposition products of rocks which may be suitable for building roads, and the like, and which are characterized chiefly by having a certain amount of binding quality when they are packed at optimum moisture and dried. This binding quality is due to the more or less chemically active silts and clays present or rock fines such as, finely pulverized lime-rock or caliche which also contributes this property.

The "tall oil" referred to is the liquid resin obtained in digesting wood to wood pulp and may be chemically modified as by hydrogenation, etc. It is a dark brown, fairly thin oil, soluble in alcohol, ether and acetone.

The term "substantially petroleum-hydrocarbon insoluble pine wood resin" hereinbefore referred to is a resinous material which may be prepared from pine wood, preferably from stump pine wood and which comprises the resinous residue remaining after separation of the rosin from the total resinous extract of the wood. Thus, the pine wood, which may or may not have been steamed to remove volatile constituents such as turpentine and pine oil, may be extracted with a coal tar hydrocarbon such as benzol or toluol, and the extract then freed of volatile constituents, leaving a residue consisting of a mixture of wood rosin and the petroleum-hydrocarbon insoluble resin. Extraction of this mixture with a petroleum hydrocarbon such as, for example, gasoline, dissolves and removes the rosin. After separation of the rosin, high in abietic acid, a resinous residue remains which is low in abietic acid and which is substantially insoluble in petroleum hydrocarbons. Alternatively, the residue of the initial coal tar hydrocarbon extract may be treated with a mixture of a petroleum hydrocarbon, as gasoline, and furfural and the two layers which form separated, in which case the petroleum-hydrocarbon insoluble pine wood resin is found dissolved in the furfural from which it may be obtained by evaporation of the furfural. Other methods of isolating the desired petroleum-hydrocarbon insoluble pine wood resin may be employed, if desired, such as with use of other solvents for extracting the total resin content from the wood. The resin may be defoamed by steaming or heat treated to remove volatile substances.

This resinous material is characterized by a dark red-brown color, cherry red in solution, and by substantial insolubility in petroleum hydrocarbons; but it will vary somewhat in its specific characteristics such as acid number, melting point, exact petroleum ether solubility, non-carboxylic hydroxyl content and iodine number, depending on the details of the extraction process utilized. The resin will meet or nearly meet the following specifications; namely, substantial insolubility in petroleum hydrocarbons, substantially complete solubility in alcohol, a methoxy content of from about 3 percent to about 7 percent (usually from about 4 percent to about 6 percent), an acid number in the range from about 80 to about 110, a drop melting point from about 95° C. to about 125° C., and a non-carboxylic hydroxyl content of about 5 to about 9 percent.

In carrying out the invention, it will be found that tall oil fractions and tall oil blends with other rosinyl compounds may be used instead of straight tall oil and substantially petroleum-hydrocarbon insoluble pine wood resin, as long as the suspension formed thereof is maintained within limits so that properties analogous to straight tall oil substantially petroleum-hydrocarbon insoluble pine wood resin suspension is obtained.

As hereinbefore mentioned, the invention comprises admixing with the soil to be stabilized an aqueous suspension or slurry of the tall oil-substantially petroleum-hydrocarbon insoluble pine wood resin mixture. Such suspensions are formed by mixing the tall oil and substantially petroleum-hydrocarbon insoluble pine wood resin together, fluxing to compatibility, cooling, grinding to pass a 40 mesh sieve, and then mixing with water to which has been added an alkaline agent, such as sodium hydroxide, potassium hydroxide, trisodium phosphate, sodium silicate, etc. Such alkaline agents saponify a minor proportion of the tall oil-resin mixture which saponified proportion serves as a dispersing agent for the mixture. Other dispersing agents, such as dispersive clays or organic materials will be found suitable for this purpose. From about 1 to about 6 percent of the dispersing agent based on the weight of the tall oil-resin mixture, is required to maintain the mixture in aqueous suspension.

In employing an alkali, for example, sodium hydroxide in preparing the suspension, it has been found preferable to dissolve from about 0.1 to about 10.0 parts by weight of the alkali in 1000 parts of water and thereafter adding with stirring from about 10 to about 150 parts by weight of the tall oil-resin mixture.

To establish the stabilizing activity of a stabilizing material, a laboratory method has been developed which gives an indication of the stabilizing activity which may be expected of the material in the field. It is verified by sufficient field experience to be used for making recommendations as to the amount of stabilizer to be used in field construction. The extent of packing the soil samples by the laboratory method is accurately controlled as well as the moisture in the samples at the time of packing. The samples are cured uniformly and tested with a capillary rise test which gives information as to the tendency of the soil to pick up water from a wet subgrade when the soil is used for construction purposes. These capillary rise tests are run for only 24 hours since the dominant portion of the moisture pickup occurs during this period. The allowable moisture pickup is that required to bring the sample to ¾ optimum moisture which is based on the principle that if the soil does not increase in moisture content over ¾ optimum under adverse moisture conditions, it will continue to give adequate bearing capacity, and satisfactory service.

The laboratory method utilizes a sand temper such as is the standard in the foundry industry. A quantity of soil is tamped in a cylindrical mold to form a cylinder of soil 2 inches in diameter and slightly over 1½ inches high. This mold is constructed so that instead of having a firm bottom, it rides on a false bottom which in its movement contributes packing on the bottom of the sample while the top is being tamped. After 10 tamps are delivered to the top of the sample, the mold is reversed and the bottom of the sample is also given 10 tamps, thereby providing a uniformity of packing not otherwise achieved. By means of a registering plunger, the sample is then moved in the mold so that any excess over the 1½ inch height projects above the top of the mold and can be struck off. This is done for the purpose of obtaining a series of samples exactly 1½ inches high. Work with this equipment has established that it is preferable to tamp samples containing stabilizer at about 90% of optimum moisture as determined by standard equipment (see A. S. T. M. designation: D558–40T). With tamping at this slightly low moisture content, there would be a tendency for the sample to show slightly lower density than that obtainable at optimum moisture. To obtain specimens having a density equivalent to maximum density, an extra weight is placed on the standard foundry sand rammer to increase the tamping force.

After a series of samples with varying amounts of stabilizer is prepared, they are allowed to dry back to 60% of optimum moisture in a pan over water. After the samples have gone through this curing and dying period, they are placed in ¼ inch of water for a period of 24 hours in a pan with a tight lid and are then reweighed to determine the moisture pick-up. These figures are reported alongside a figure of the amount of moisture which that particular sample will have to pick up to reach ¾ of optimum moisture. If the figure of moisture pickup is less than that required to bring the sample to ¾ optimum moisture, sufficient stabilizer is considered to be present for field proportioning and construction.

The following example will serve to illustrate the invention, although it will be understood that the example is in no way intended to limit the scope of the invention.

EXAMPLE

A loam-type plastic soil, 100% of which passed a No. 10 mesh sieve, was classified as a Public Roads Administration class A–4 plastic soil. Specimens 2 inches in diameter and 1½ inches high were made from this soil compacted to standard density and using different quantities of tall oil, resin, and tall oil-resin suspension. These results are shown in the following table:

TABLE
*Capillary rise test*

| No. | Type soil A-4 plastic | | Optimum moisture 21.0% | | | | Density 102 lbs./cu. ft. | |
|---|---|---|---|---|---|---|---|---|
| | Stabilizer/sq. yd. 6" depth, pounds | Moisture at compaction | Moisture when placed in ¼" H₂O | Moisture content after 2 hrs. | Moisture content after 24 hrs. | Moisture pickup in 24 hrs. | Moisture pickup to give ¾ optimum | Remarks |
| 1 | None | 17.9 | 12.6 | | 32.4 | 19.8 | 3.1 | Soft to top, slaking. |
| 2 | ----do---- | 17.9 | 12.6 | 15.6 | 32.8 | 20.2 | 3.1 | Do. |
| 3 | Tall oil 6 | 17.9 | 11.8 | 15.7 | 27.4 | 15.6 | 3.9 | Do. |
| 4 | Tall oil 6 | 17.9 | 12.5 | | 28.4 | 15.9 | 3.2 | Do. |
| 5 | Tall oil 8 | 17.9 | 12.6 | 16.0 | 27.1 | 14.5 | 3.1 | Do. |
| 6 | Tall oil 8 | 19.0 | 12.8 | | 24.6 | 11.8 | 2.9 | Do. |
| 7 | Tall oil 6 | 19.0 | 12.8 | 15.5 | 23.6 | 10.8 | 2.9 | Do. |
| 8 | Tall oil 8 | 17.9 | 12.5 | 14.7 | 23.2 | 10.7 | 3.2 | Do. |
| 9 | Resin 6 | 20.2 | 12.6 | | 19.4 | 6.8 | 3.1 | Soft to ½" sl. swell. |
| 10 | Resin 8 | 19.6 | 12.4 | | 17.8 | 5.4 | 3.6 | Soft to water line. |
| 11 | Resin-tall oil 6 | 19.0 | 12.0 | | 16.2 | 4.2 | 4.5 | Do. |
| 12 | Resin-tall oil 8 | 19.2 | 11.7 | | 14.7 | 3.0 | 4.8 | Do. |

*Method of incorporating stabilizer into soil*

No. 1 and 2—No stabilizer used.
No. 3 and 5—Tall oil introduced into soil as alkaline slurry with 18% of the tall oil neutralized with NaOH.
No. 4 and 6—Tall oil introduced into soil as alkaline slurry with tall oil completely neutralized with NaOH.
No. 6 and 7—Straight tall oil. Mixed into soil directly.
No. 9 and 10—Resin introduced into soil as alkaline slurry with 18% of the resin neutralized with NaOH.
No. 11 and 12—Tall oil-resin (1:2) mixture fluxed together to compatibility, cooled, ground to 40 mesh and used in alkaline slurry with 18% of the mixture neutralized with NaOH.

The above example shows that while tall oil used alone exerts a slight stabilizing action toward the soil, it is definitely inferior to the resin. Furthermore, the amount of stabilization achieved by using 6 and 8 pounds of tall oil indicates that it would be necessary to employ 20 to 30 pounds of tall oil per square yard per six inch treatment of soil. The example further shows that while resin used alone exerted a good stabilizing action toward the soil, the blend of tall oil and resin gave improved results. Furthermore, the amount of stabilization achieved by using 6 and 8 pounds of resin indicates that it would be necessary to employ about 11 pounds of resin per square yard per six inch treatment of soil. In contradistinction it will be noted that 7 pounds of the tall oil-resin blend was adequate to achieve satisfactory stabilization.

The proportion of tall oil-resin required to secure the desired stabilizing effect depends primarily upon the nature of the soil, some soils requiring more of the stabilizing agent than others to obtain the same degree of stabilization. Ordinarily, however, the use of between about 1.0 and about 10 percent of a tall oil-resin mixture, based on the weight of the soil, will be found to produce good results. The amount of resin present in the tall oil-resin mixture should be a major amount.

The addition of the tall oil-resin suspension to the soil may be carried out in a number of ways, the most convenient of which depends upon the particular type of soil and the conditions under which the operation is carried out. For example, the soil may first be graded or blended in the customary manner and the tall oil-resin suspension mixed therewith prior to use. In stabilizing roads already constructed, the surface layer of the road may be harrowed or plowed and the tall oil-resin suspension applied and mixed in by scarifying, blading, or harrowing after which the road may be rolled and the surface compacted. In some instances, it may be sufficient merely to sprinkle the suspension over the road. In still other instances, the soil and tall oil-resin suspension may be mixed thoroughly in a machine mixer. If a finishing machine is used, the mixture may be spread over the subgrade in approximately 3 inch lifts, laid to a uniform cross-section; otherwise the mixture should be spread in 2 inch lifts. Each lift should be suitably compacted with a roller.

The stabilization of soil in accordance with this invention improves the resistance of the soil to erosion and gives the constructions formed better all-around wearing characteristics. These beneficial results can be obtained in a simple, practical and economical manner.

Where in the specification and appended claims the term "resin" is used, it is the substantially petroleum-hydrocarbon insoluble pine wood resin.

What is claimed and desired to be protected by Letters Patent is:

1. The method of stabilizing soil which comprises admixing therewith an aqueous suspension of a mixture of tall oil and a substantially petroleum-hydrocarbon insoluble pine wood resin, said suspension containing a dispersing agent for the mixture.

2. The method of stabilizing soil which comprises admixing therewith an aqueous suspension of a mixture of tall oil and a substantially petroleum-hydrocarbon insoluble pine wood resin, said suspension containing a minor proportion of the tall oil-resin mixture saponified by an alkaline agent.

3. The method of stabilizing soil which comprises forming an aqueous suspension of tall oil and a substantially petroleum-hydrocarbon insoluble pine wood resin by fluxing the tall oil and resin together to form a mixture, then adding a small amount of dilute aqueous solution of an alkali to saponify a minor proportion of the mixture, and thereafter admixing said suspension with the soil.

4. The method of stabilizing soil which comprises forming an aqueous suspension of tall oil and a substantially petroleum-hydrocarbon insoluble pine wood resin by fluxing the tall oil and resin together to form a mixture containing a major proportion of resin, then adding a small amount of dilute aqueous solution of sodium hydroxide to saponify a minor proportion of the mixture, and thereafter admixing said suspension with the soil.

5. The method of stabilizing soil which comprises admixing therewith from about 1 to about 10 percent by weight of a 1:2 mixture of tall oil and a substantially petroleum-hydrocarbon insoluble pine wood resin in the form of a dilute aqueous suspension formed by mixing said tall oil-resin mixture with water having dissolved therein from about 1.0 to about 6 percent of sodium hydroxide based on the weight of the tall oil-resin mixture.

6. A stabilized soil having dispersed therein a mixture of tall oil and a substantially petroleum-hydrocarbon insoluble pine wood resin and a dispersing agent for said mixture.

7. A stabilized soil having dispersed therein a mixture of tall oil and a substantially petroleum-hydrocarbon insoluble pine wood resin with a minor proportion of the tall oil-resin mixture saponified by an alkaline agent.

8. A stabilized soil having dispersed therein a mixture comprising a minor proportion of tall oil saponified with an alkali, and a substantially petroleum hydrocarbon-insoluble pine wood resin.

9. A stabilized soil having dispersed therein a mixture comprising a minor proportion of tall oil saponified with sodium hydroxide and a substantially petroleum hydrocarbon-insoluble pine wood resin.

10. A stabilized soil having dispersed therein from about 1 to about 10 per cent by weight of a 1:2 mixture of tall oil saponified with sodium hydroxide and a substantially petroleum hydrocarbon-insoluble pine wood resin.

HAZEL E. MILLER.
*Administratrix of the Estate of Abraham B. Miller, Deceased.*